(12) United States Patent
Tseng et al.

(10) Patent No.: US 8,604,438 B2
(45) Date of Patent: Dec. 10, 2013

(54) METHOD FOR IDENTIFYING AND SORTING SENSING SIGNALS WITH RESPECT TO CRYSTAL LOCATION OF SCINTILLATION DETECTOR

(75) Inventors: Fan-Pin Tseng, Taipei (TW); Meei-Ling Jan, Taoyuan County (TW)

(73) Assignee: Institute of Nuclear Energy Research Atomic Energy Council, Executive Yuan, Taoyuan County (TW)

( * ) Notice: Subject to any disclaimer, the term of this patent is extended or adjusted under 35 U.S.C. 154(b) by 648 days.

(21) Appl. No.: 12/915,641

(22) Filed: Oct. 29, 2010

(65) Prior Publication Data

US 2011/0101227 A1  May 5, 2011

(30) Foreign Application Priority Data

Oct. 30, 2009 (TW) ................................ 98136861 A (51) Int. Cl.
*G01T 1/16* (2006.01)
*G01T 1/20* (2006.01)

(52) U.S. Cl.
USPC .............. 250/363.09; 250/369; 250/361 R; 382/293; 382/131

(58) Field of Classification Search
USPC .......... 250/362, 361 R, 369, 370.11, 363.03, 250/366, 363.08, 363.09; 382/276, 278, 382/279, 282, 289, 293, 131
See application file for complete search history.

(56) References Cited

U.S. PATENT DOCUMENTS 5,444,253 A * 8/1995 Berlad ......................... 250/369
6,348,692 B1 * 2/2002 Chapuis et al. ............... 250/369

OTHER PUBLICATIONS

Chaudhari et al., "Crystal identification in positron emission tomography using nonrigid registration to a Fourier-based template." Phys. Med Biol. Sep. 21, 2008; 53(18) (5011-5027).*
Stonger et al., "Optimal calibration of PET crystal position maps using Gaussian mixture models," IEEE Transactions on Nuclear Science, Feb. 2004; 51(1) (85-90).*

* cited by examiner

*Primary Examiner* — David Porta
*Assistant Examiner* — Yara Green
(74) *Attorney, Agent, or Firm* — WPAT, PC; Justin King (57) ABSTRACT

The present invention provides a method for identifying and sorting sensing signals with respect to crystal locations of a scintillation detector, comprising steps of: (a) providing a crystal map detected by a crystal array, the crystal map having a plurality of peak points, each being represented by a coordinate location; (b) finding a basis point with respect to a specific area enclosing an amount of the peak points within the crystal map; (c) determining the peak point within the specific area having the shortest distance to the basis point, the peak point corresponding to a crystal element of the crystal array; (d) changing the location of the specific area; and (e) repeating steps (b) to (d) for a plurality of times to find all the crystal elements with respect to the peak points respectively.

10 Claims, 12 Drawing Sheets

METHOD FOR IDENTIFYING AND SORTING SENSING SIGNALS WITH RESPECT TO CRYSTAL LOCATION OF SCINTILLATION DETECTOR

FIELD OF THE INVENTION

The present invention generally relates to a method for image processing and, more particularly, to a method for identifying and sorting sensing signals with respect to crystal locations of a scintillation detector. The method identifying and sorting the peak locations in the crystal map with respect to the crystal array of a scintillation detector, so as to acquire the crystal locations with respect to the peak points.

BACKGROUND OF THE INVENTION

Figure 1:
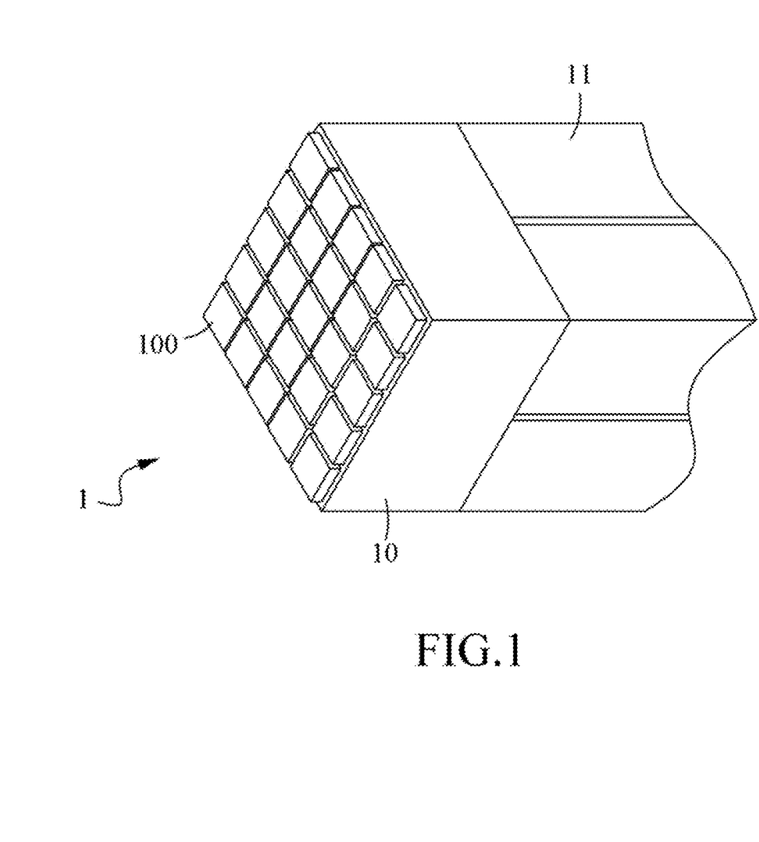
FIG. 1 is a schematic diagram of a conventional crystal array module.

The scintillation detector module 1, as shown in FIG. 1, is widely used in positron emission tomography and single photon emission tomography. The scintillation detector module 1 comprises a scintillation crystals array 10 for converting gamma photons into scintillation photons. The crystal array 10 comprises a plurality of scintillation crystals 100 coupled with photomultiplier tubes (PMTs) 11. Each PMT has a photocathode to emit photo-electrons converted from scintillation photons by the scintillation crystals. The photo-electrons bombard the dynode to cause secondary emission and emit a plurality of secondary electrons. The secondary electrons are amplified after hitting the dynode. Finally, the anode collects all the emitted electrons to generate an output pulse signal. The intensity of the output signal depends on the number of photons received by the photocathode. The photons are processed by a readout electronic circuit to output gamma rays and crystal interaction location signals. If a uniform gamma-ray source continuously illuminates a detector module, the gamma rays and crystal interaction location signals can be shown as in FIG. 2A.

Figure 2A:
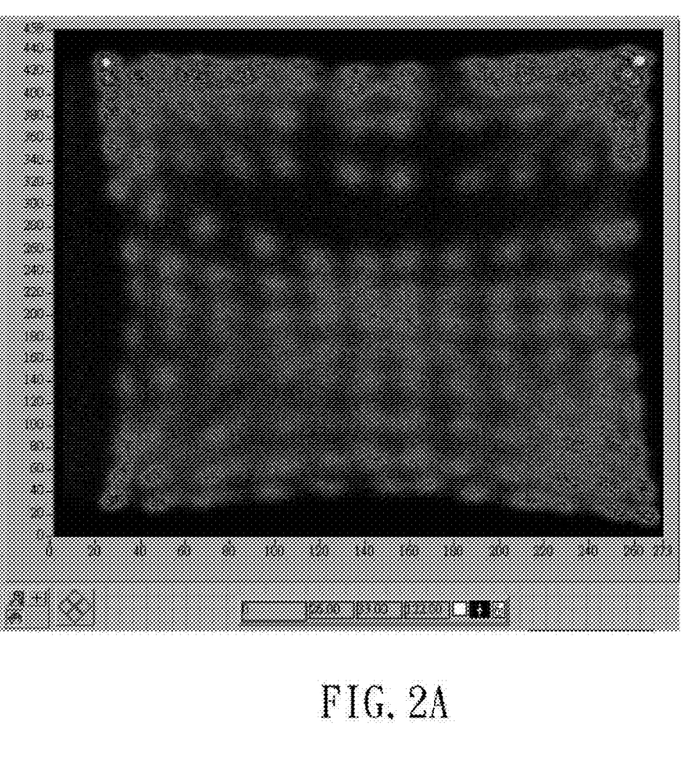
FIG. 2A shows the distribution of peak points on a crystal map.

The identification of crystal interaction locations is important for identification of radiation source using the scintillation detector. In FIG. 2A, a crystal map with respect to a plane source detected by a detector module is shown. In the crystal map, each group of pixels represents a crystal response. The crystal map varies with crystal elements, photomultiplier tubes (PMTs) and electronic circuits and also changes with the voltage, gain and system reliability of photomultiplier tubes (PMTs). The groups of points corresponding to each crystal element are not arranged as regularly as the crystal elements in the crystal array. In order to determine the location where gamma rays interact with the imaging detector, a crystal look-up table is required to interpret the location where the gamma rays interact with the imaging detector. Therefore, the sensing signals correspond to respective crystal location in the crystal array for image reconstruction. To generate the look-up table, a uniform plane source is used to generate a crystal map, which is then divided and defined. By the use of conventional techniques such as mean shift, each group of pixels is denoted by a peak point so that a crystal location corresponding to each peak point can be defined.

Figure 2B:
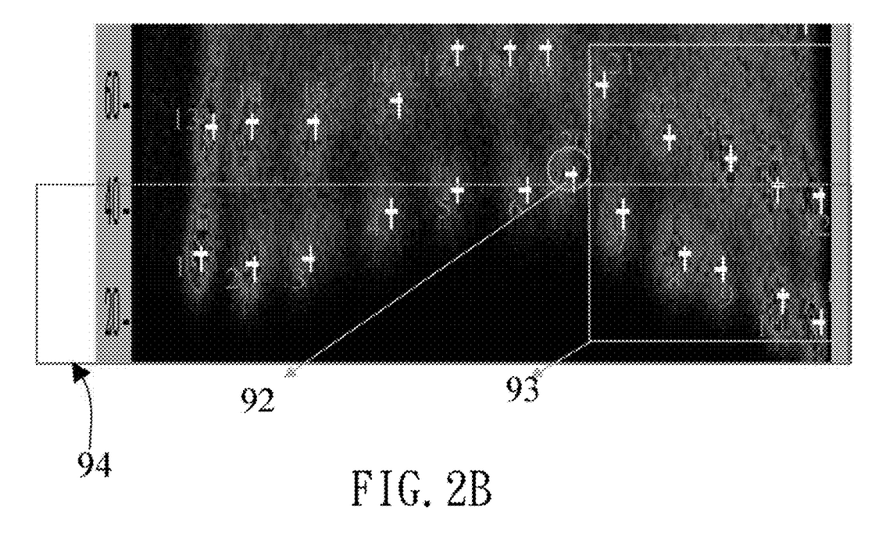
FIG. 2B shows a conventional method for determining crystal locations.

Conventionally, the coordinate locations of a plurality of peak points are sorted along the X-axis direction or the Y-axis direction and then along the other. Such method is used for a crystal map with regular arrangement of crystals, but fails to apply a twisted crystal map. For example, FIG. 2B shows such method. In FIG. 2B, the coordinate locations are sorted along the Y-axis direction to determine twelve groups of points (in a box labeled 94), which are then sorted along the X-axis direction. In this case, the group of point 20 in the area 92 is neglected to cause errors in the area 93. Moreover, the peak points with respect to the crystals can also be found using the distance and the angle. But similarly, such method is not suitable for twisted crystal maps. The crystal locations corresponding to each peak point for twisted crystal maps are preferably acquired by human labors to find the area with respect to each crystal from the twisted crystal maps. Since most of the measurement results show twisted crystal maps, considerable manpower cost and time cost are required.

SUMMARY OF THE INVENTION

The present invention provides a method for identifying and sorting sensing signals with respect to crystal locations of a scintillation detector, wherein a crystal look-up table is provided by identifying and sorting the detected crystal map to determine each crystal location with respect to the detected crystal elements so that the location where gamma rays and imaging detector are interactive can be determined.

In one embodiment, the present invention provides a method for identifying and sorting sensing signals with respect to crystal locations of a scintillation detector, comprising steps of:

(a) providing a crystal map detected by a crystal array, the crystal map having a plurality of peak points, each being represented by a coordinate location;

(b) finding a basis point with respect to a specific area enclosing an amount of the peak points within the crystal map;

(c) determining the peak point within the specific area having the shortest distance to the basis point, the peak point corresponding to a crystal element of the crystal array;

(d) changing the location of the specific area; and (e) repeating steps (b) to (d) for a plurality of times to find all crystal elements with respect to the peak points respectively.

In one embodiment, the step of finding the basis point further comprises steps of: sorting the coordinate locations corresponding to the plurality of peak points according to a first coordinate direction and a second coordinate direction; acquiring a first specific number of peak points with respect to the specific area according to the sorting result along the first coordinate direction and finding a minimum value along the second coordinate direction according to the coordinate locations with respect to the first specific number of peak points; acquiring a second specific number of peak points with respect to the specific area according to the sorting result along the second coordinate direction and finding a minimum value along the first coordinate direction according to the coordinate locations with respect to the second specific number of peak points; and using the minimum value along the first coordinate direction and the minimum value along the second coordinate direction as the coordinate values of the basis point.

In another embodiment, the step of finding the basis point further comprises steps of: sorting the coordinate locations corresponding to the plurality of peak points according to a first coordinate direction and a second coordinate direction; acquiring a first specific number of peak points with respect to the specific area according to the sorting result along the first coordinate direction; finding a minimum value along the first coordinate direction among the first specific number of peak points having smaller values along the second coordinate direction than the peak points within the specific area; acquiring a second specific number of peak points with respect to the specific area according to the sorting result along the second coordinate direction; finding a minimum value along the second coordinate direction among the second specific number of peak points having smaller values along the first coordinate direction than the peak points within the specific area; and using the minimum value along the first coordinate direction and the minimum value along the second coordinate direction as the coordinate values of the basis point.

BRIEF DESCRIPTION OF THE DRAWINGS

The objects and spirits of the embodiments of the present invention will be readily understood by the accompanying drawings and detailed descriptions, wherein.

DETAILED DESCRIPTION OF THE PREFERRED EMBODIMENT

The present invention can be exemplified but not limited by various embodiments as described hereinafter.

Figure 3:
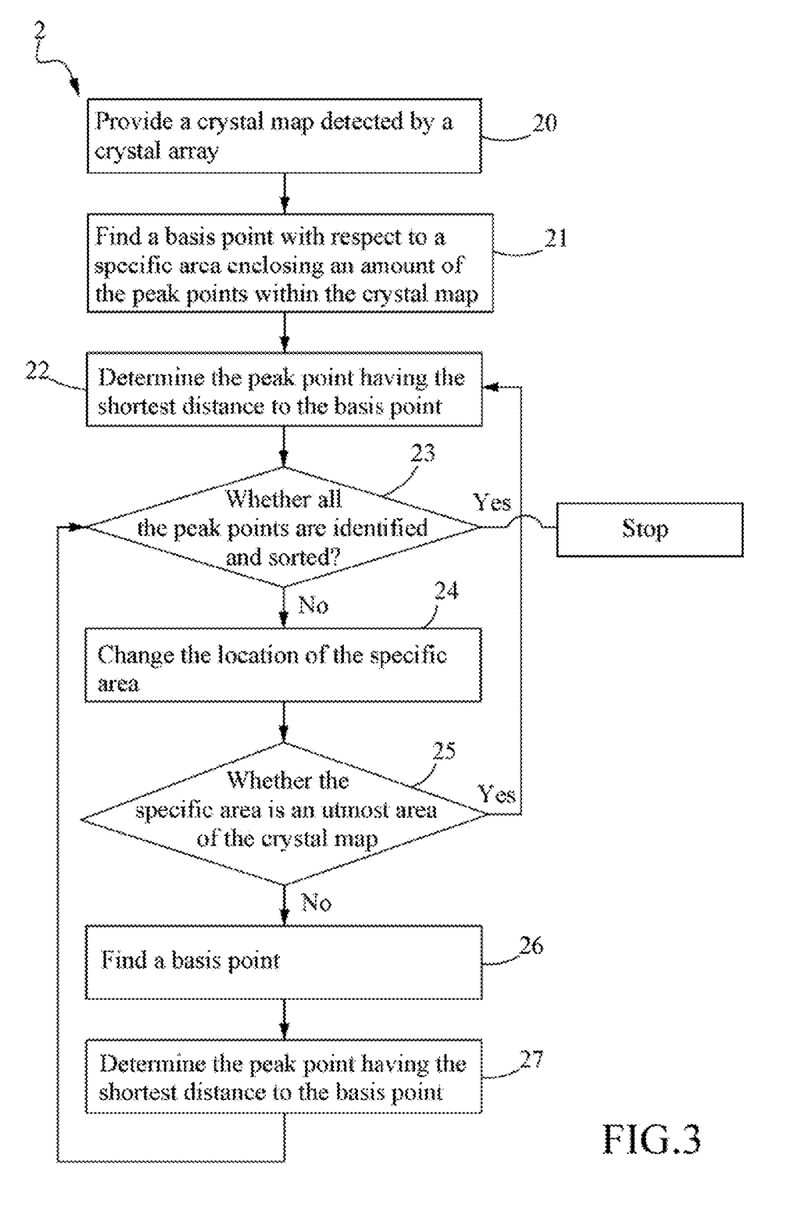
FIG. 3 is a flowchart of a method for identifying and sorting sensing signals with respect to crystal locations of a scintillation detector according to the present invention.

Please refer to FIG. 3, which is a flowchart of a method for identifying and sorting sensing signals with respect to crystal locations of a scintillation detector according to the present invention. The method 2 starts with step 20 to provide a crystal map detected by a crystal array. The crystal map has a plurality of peak points, each being represented by a coordinate location. The crystal array is a scintillation crystals array in a scintillation detector. In this step, a sensing module having a crystal array detects a plane source to generate a crystal map. It is noted that, the sensing module can be disposed in any imaging detection device for nuclear medicine application. For example, it can be used in an imaging detection device using a positron source to generate gamma rays or single photon or X-ray imaging detection device. In the present embodiment, the crystal array is a 12×12 crystal array, but is not limited thereto. The area of the plane source corresponds to the area of the crystal array in the sensing module so that each crystal is capable of sensing the signals generated by the plane source. After the crystal array detects a signal, the signal is amplified and processed by a photomultiplier tube (PMT) to provide a crystal map, as shown in FIG. 2A. The signal detection, amplification and processing are conventional and are not presented herein.

Figure 4:
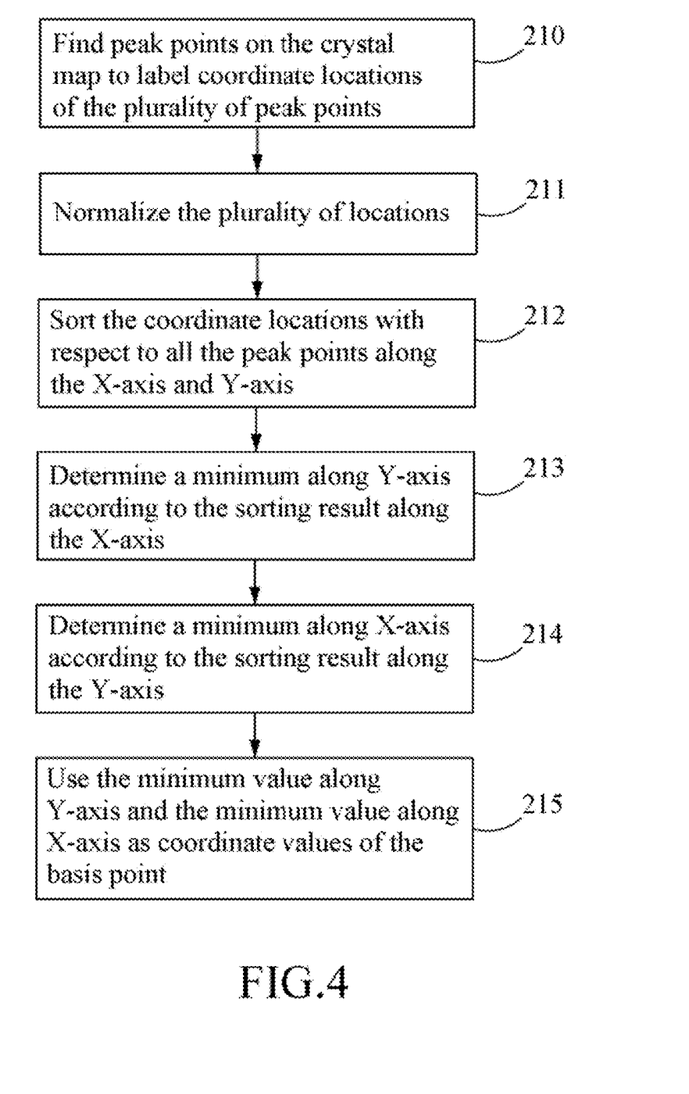
FIG. 4 is a flowchart of a step for finding basis points according to one embodiment of the present invention.
Figure 5:
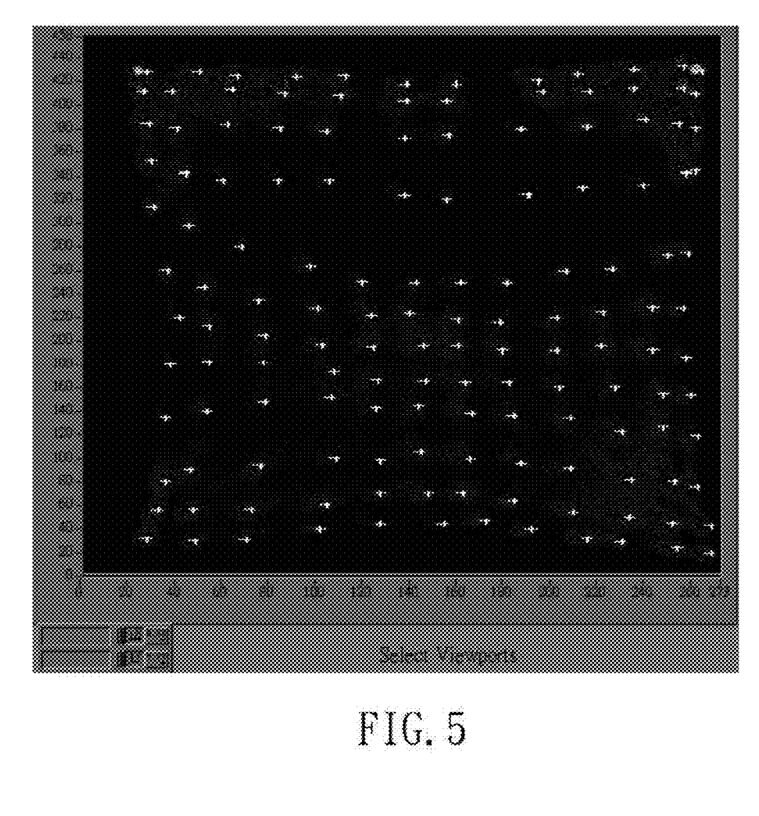
FIG. 5 shows that the peak points on the crystal map in FIG. 2A are labeled.

Then, in step 21, a basis point is found with respect to a specific area enclosing an amount of the peak points within the crystal map. As shown in FIG. 4, step 21 further comprises a step 210 to find peak points on the crystal map to label coordinate locations of the plurality of peak points. For example, in FIG. 2A, after the crystal map is acquired, coordinate locations of peak points in each group of points are found and labeled using conventional processing to result in the image in FIG. 5. The white crosses represent the coordinate locations with respect to the peak points. The coordinate location with respect to each peak point corresponds to a crystal element in the crystal array. Since distortion may occur during PMT amplification, the crystal locations with respect to each of the peak points are not easily identified.

Then, in step 211, the plurality of locations are normalized. Since the detected crystal map is not necessarily the same size as the crystal array, normalization is required to match the sizes of the crystal map and the crystal array. For example, in FIG. 5, since the locations of peak points have been labeled by the crosses in FIG. 3, the location of each peak point can be defined as a coordinate location (x,y). In step 211, the minimum and the maximum along the X-axis direction and the minimum and the maximum along the Y-axis direction are acquired from the coordinate values corresponding to the peak points. The ratio is then calculated to adjust the coordinates of the crystal map according to the ratio. Accordingly, the crystal map is identical to the crystal array in size. Normalization is conventional and thus description thereof is not presented herein.

Figure 6A:
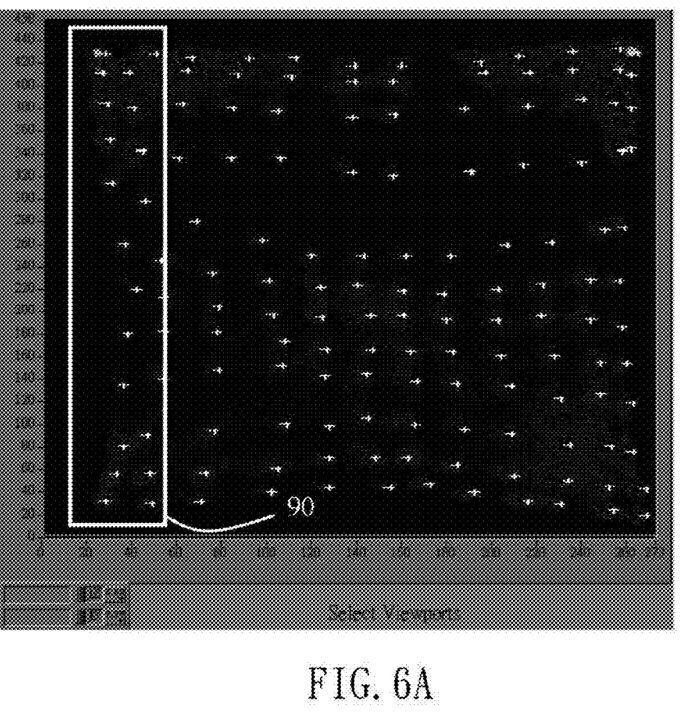
FIG. 6A to FIG. 6D show schematic diagrams wherein the peak points are framed by specific area to find a basis point.
Figure 6B:
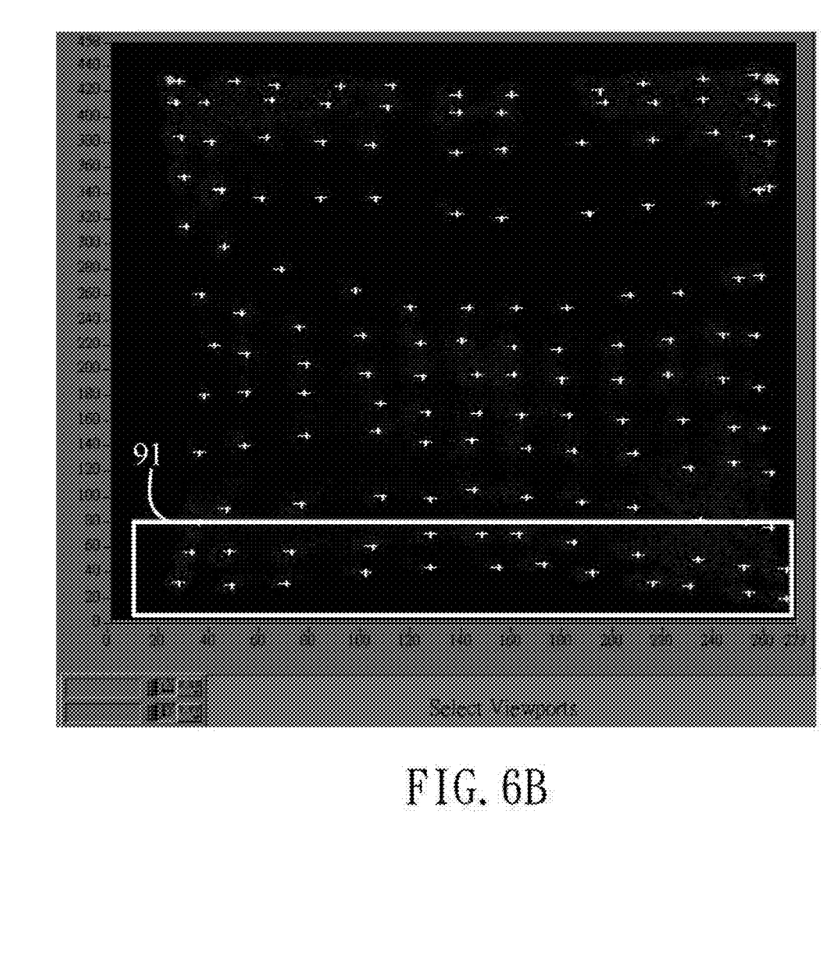

Step 212 is then performed to sort all the peak points along the X-axis from small coordinate values x(1) to large coordinate values x(144). Then, the peak points are sorted along the Y-axis from small coordinate values y(1) to large coordinate values y(144). Then, step 213 is performed to acquire a first specific number of peak points with respect to the specific area according to the sorting result along the X-axis direction and find a minimum value along the Y-axis direction according to the coordinate locations with respect to the first specific number of peak points. In this step, the specific area is the area 90 as shown in FIG. 6A, which encloses a specific number of peak points, for example, 24 peak points in the present embodiment. Since it is the first time to find the basis point (from crystal locations with respect to the peak points at the bottom left), the values enclosed by the specific area are 24 minimum values x(1)~x(24). Then the minimum Y-axis value along Y-axis can be found from the 24 peak points in the specific area.

Then, step 214 is performed to acquire a second specific number of peak points with respect to the specific area according to the sorting result along the Y-axis and find a minimum value along the X-axis direction according to the coordinate locations with respect to the second specific number of peak points. This step is similar to step 213 except that the peak points within the specific area are the 24 peak points with minimum values y(1)~y(24) along the Y-axis in this step. Then, the peak points with minimum values along the X-axis with respect to y(1)~y(24) are determined. Finally, in step 215, the minimum value along the Y-axis direction (determined in step 213) and the minimum value along the X-axis direction (determined in step 214) are treated as the coordinate values of the basis point. The basis point is an utmost basis point along the X-axis direction or the Y-axis direction.

Figure 7:
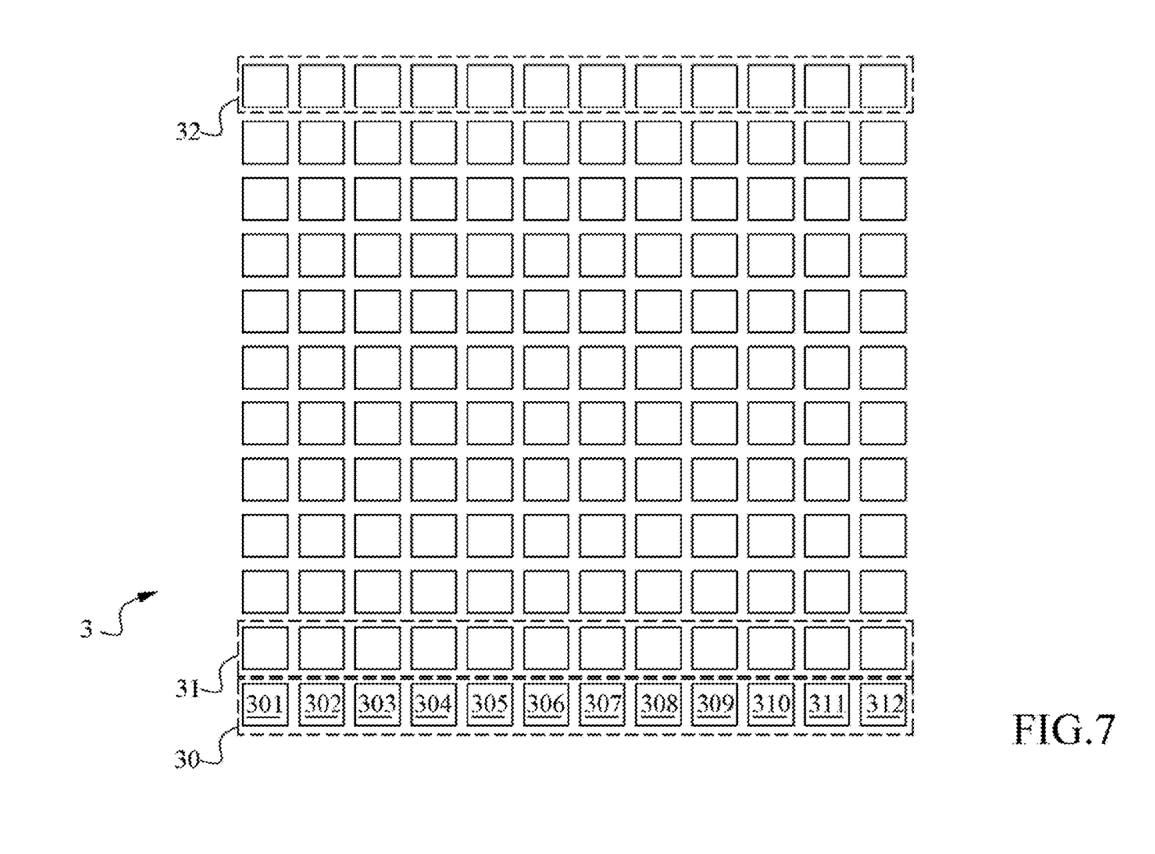
FIG. 7 shows a crystal map detected by a crystal array according to the present invention.

Returning to step 22 in FIG. 3, the peak point within the specific area, wherein the peak point has the shortest distance to the basis point, is determined. The peak point corresponds to a crystal element of the crystal array. In this step, after the basis point is determined, the distances from 144 peak points to the basis point are determined. The peak point corresponding to the shortest distance is then determined. For example, the peak point corresponds to the bottom left crystal 30 in the crystal array in FIG. 7. Afterwards, the peak point is coded to identify the crystal location in FIG. 7 with respect to the peak point. The crystal location is then masked, which means that it has been identified. In the following steps for determining the distances from the basis point to the peak points, the masked point will be avoided. This has no influence on the sorting result along the X-axis direction and Y-axis direction.

Step 23 is then performed to determine whether all the peak points are identified and sorted. The procedure ends if all the peak points are identified and sorted; otherwise, the crystal locations with respect to other peak points are to be determined. In the present embodiment, not all the peak points have been determined with respect to each crystal in the crystal array in FIG. 7. Therefore, step 24 is performed to change the location of the specific area. In step 25, it is to be determined whether the specific area is an utmost area of the crystal map, i.e., covering the peak points on the side. The procedure goes to step 21 if the specific area is an utmost area; otherwise, the procedure goes to step 26 to find a basis point.

Figure 6C:
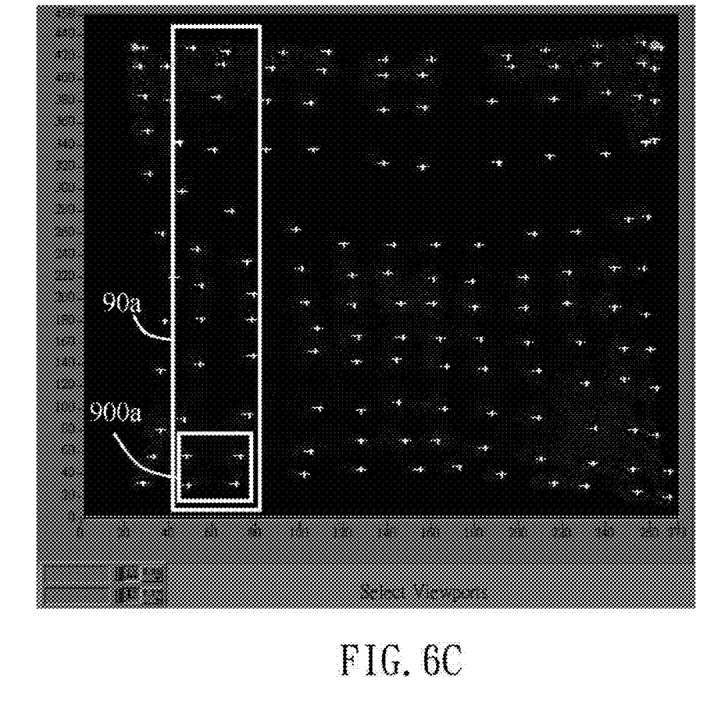
Figure 8:
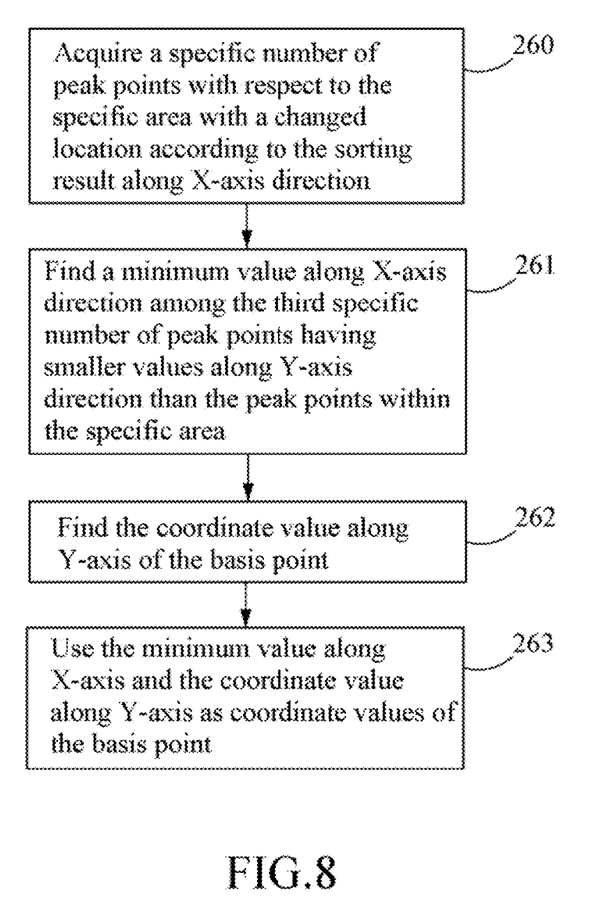
FIG. 8 is a flowchart of a step for finding basis points according to another embodiment of the present invention.

In step 25, the specific area is not an utmost area at the present stage in this embodiment. Therefore, step 26 will be performed to find a basis point. Step 26 is different from step 21 because the peak points are not necessarily the points with the utmost values along both X-axis and Y-axis. Therefore, it is very likely to misjudge the crystal location corresponding to the peak points because of interference of other neighboring peak points. Therefore, step 26 further comprises step 260 for acquiring a third specific number of peak points with respect to the specific area with a changed location according to the sorting result along X-axis direction, as shown in FIG. 8. The third specific number of peak points with respect to the specific area with a changed location have coordinate values x(13)~x(36), as shown in the area 90a in FIG. 6C.

Then, in step 261, a minimum value is determined to be a basis value along X-axis direction among the third specific number of peak points whose coordinate value along Y-axis direction is within a specific range. In step 261, the specific range refers to four minimum values along Y-axis, which are acquired from the peak points x(13)~x(36) in the area 90a. Even though four minimum values are determined in the present embodiment, the present invention is not limited thereto. Minimum values along X-axis are acquired from the peak points corresponding to the four minimum values along Y-axis. Then, step 262 is performed to find the coordinate value along Y-axis of the basis point. In this step, the Y-axis value of the basis point is the coordinate value along Y-axis in step 21. Finally, in step 263, the minimum value along X-axis (in step 261) and the coordinate value along Y-axis (in step 262) are regarded as coordinate values of the basis point. Returning to FIG. 3, step 27 is performed to determine the peak point within the specific area having the shortest distance to the basis point. In this step, after the basis point is determined, the first peak point has been identified and masked. Therefore, the distances from the remaining 143 peak points to the basis point are to be determined. The peak point having the shortest distance to the basis point corresponds to the crystal 302 at the bottom of the crystal array in FIG. 7. Afterwards, the peak point is coded and identified to correspond to a crystal location in FIG. 7. The peak point is then masked.

Then, step 23 is repeated to determine the locations with respect to the peak points in the crystal map. In the present embodiment, step 26 is performed for ten times to determine ten corresponding peak points 302-311. When the peak point at the right on the first row is identified, the requirement in step 24 is met and the procedure goes back to step 21. Then, step 21 is performed to find the peak point corresponding to the 12$^{th}$ crystal 312 from the right on the first row in FIG. 7. The detailed description of these steps is not presented herein. The flowchart in FIG. 3 is for finding the peak points with respect to a row in the crystal array (such as the first row in the crystal array 30 in FIG. 7). Therefore, when the peak points in the crystal map have been matched with a row of crystals, the procedure in FIG. 3 is repeated so as to complete the peak points corresponding to the crystals in the 2$^{nd}$ to the 13$^{th}$ rows in FIG. 7. However, it is noted that the number of selected peak points in the specific area is decreasing. For example, when the peak points with respect to the 2$^{nd}$ row crystals of the crystal array 31 are to be determined, the number of peak points in the specific area becomes 22. Therefore, the coordinates of the unidentified peak points have to be re-sorted from small coordinate values to large coordinate values, i.e., from x(1) to x(132) along X-axis and from y(1) to y(132) along X-axis. Similarly, when the peak points with respect to the 3$^{rd}$ row crystals of the crystal array 31 are to be determined, the number of peak points in the specific area becomes 20. The coordinates of the unidentified peak points have to be re-sorted from small coordinate values to large coordinate values, i.e., from x(1) to x(120) along X-axis and from y(1) to y(120) along X-axis. Such procedure is repeated until there are only 12 peak points left. The 12 peak points are the peak points corresponding to each crystal on the 12$^{th}$ row of the crystal array 32 in FIG. 7 according to sorting result along X-axis.

Figure 6D:
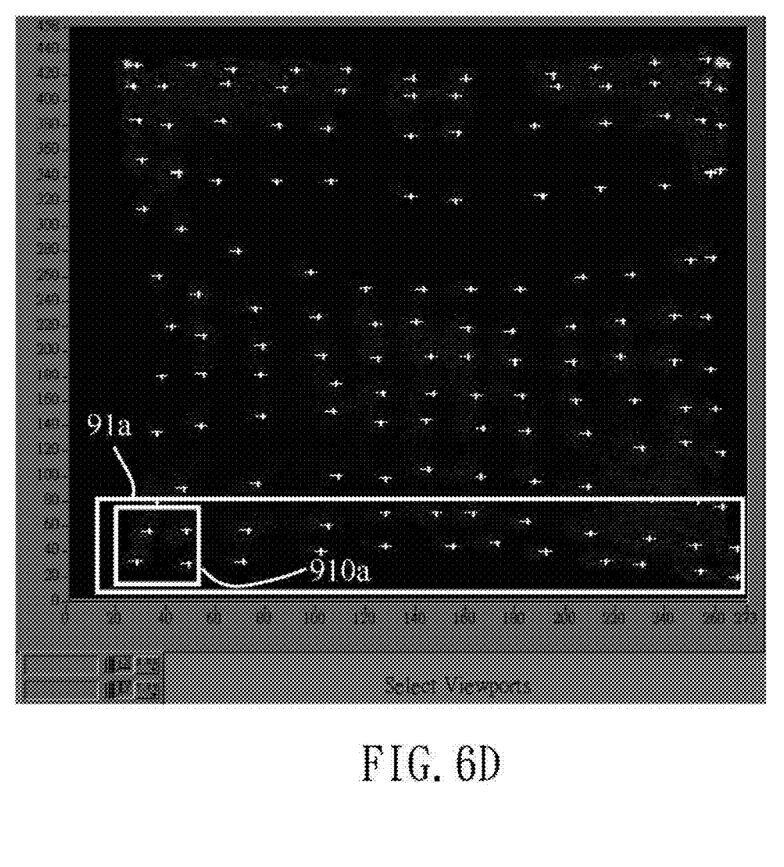

In FIG. 3, the method for finding the basis point at the utmost areas (for example, in step 21) is different from the method for finding the basis point at the central areas (for example, in step 26). However, these methods can be alternated in another embodiment. For example, step 21 can be performed by a method similar to step 26 except that the coordinate values along Y-axis are determined using the method similar to step 260 for acquiring a four specific number of peak points, y(1)~y(12), in the area 91a in FIG. 6D according to the sorting result along Y-axis after the coordinate value along X-axis are found using the method in step 26. Then, a minimum value along Y-axis is found as a basis value along the Y-axis among the fourth specific number of peak points having smaller values along the X-axis than the peak points within the specific area. That is, the four minimum values (as shown in the area 910a) are acquired from smaller x values to larger x values from the peak points with Y-axis values y(1)~y(12) covered by the area 91a. Even though there are four minimum values in the present embodiment, the present invention is not limited thereto. Then, the Y-axis coordinate value of the basis point can be determined by selecting a minimum Y-axis value from the peak points corresponding to the four x values. Similarly, the X-axis coordinate value of the basis point in step 26 can be determined using the method similar to step 21. Anyone with ordinary skill in the art can make modifications as taught previously. The detailed description thereof is not repeated herein.

Accordingly, the present invention discloses a method for identifying a location of gamma interaction where scintillation light is generated and a flat panel gamma imaging head apparatus. Therefore, the present invention is useful, novel and non-obvious.

Although the present invention has been disclosed and illustrated with reference to particular embodiments, the principles involved are susceptible for use in numerous other embodiments that will be apparent to persons skilled in the art. The present invention is, therefore, to be limited only as indicated by the scope of the appended claims.

What is claimed is:

1. A method for identifying and sorting sensing signals with respect to crystal locations of a scintillation detector, comprising steps of:

(a) providing a crystal map detected by a crystal array, the crystal map having a plurality of peak points, each being represented by a coordinate location;
(b) finding a basis point with respect to a specific area enclosing an amount of the peak points within the crystal map;
(c) determining the peak point within the specific area having the shortest distance to the basis point, the peak point corresponding to a crystal element of the crystal array;
(d) changing the location of the specific area; and
(e) repeating steps (b) to (d) for a plurality of times to find all crystal elements with respect to the peak points respectively.

2. The method as recited in claim 1, wherein the step of finding the basis point further comprises steps of:
sorting the coordinate locations corresponding to the plurality of peak points according to a first coordinate direction and a second coordinate direction;
acquiring a first specific number of peak points with respect to the specific area according to the sorting result along the first coordinate direction and finding a minimum value along the second coordinate direction according to the coordinate locations with respect to the first specific number of peak points;
acquiring a second specific number of peak points with respect to the specific area according to the sorting result along the second coordinate direction and finding a minimum value along the first coordinate direction according to the coordinate locations with respect to the second specific number of peak points; and
using the minimum value along the first coordinate direction and the minimum value along the second coordinate direction as coordinate values of the basis point.

3. The method as recited in claim 2, wherein the step (e) further comprises steps of:
acquiring a third specific number of peak points with respect to the specific area with a changed location according to the sorting result along the first coordinate direction;
finding a minimum value along the first coordinate direction as a basis value along the first coordinate direction among the third specific number of peak points having smaller values along the second coordinate direction than the peak points within the specific area; and
using the basis value along the first coordinate direction and the minimum value.

4. The method as recited in claim 2, wherein the coordinate locations are sorted from small coordinate values to large coordinate values.

5. The method as recited in claim 1, wherein the step of finding the basis point further comprises steps of:
sorting the coordinate locations corresponding to the plurality of peak points according to a first coordinate direction and a second coordinate direction;
acquiring a first specific number of peak points with respect to the specific area according to the sorting result along the first coordinate direction;
finding a first minimum value along the first coordinate direction among the first specific number of peak points whose coordinate value along the second coordinate direction is within a first specific range;
acquiring a second specific number of peak points with respect to the specific area according to the sorting result along the second coordinate direction;
finding a second minimum value along the second coordinate direction among the second specific number of peak points whose coordinate value along the second coordinate direction is within a second specific range; and
using the first minimum value along the first coordinate direction and the second minimum value along the second coordinate direction as coordinate values of the basis point.

6. The method as recited in claim 5, wherein the coordinate locations are sorted from small coordinate values to large coordinate values.

7. The method as recited in claim 5, wherein the step (e) further comprises steps of:
acquiring a third specific number of peak points enclosed by the specific area with respect to a changed location according to the sorting result along the first coordinate direction;
finding a minimum value along the first coordinate direction as a basis value along the first coordinate direction among the third specific number of peak points whose coordinate value along the second coordinate direction is within a third specific range; and
using the basis value along the first coordinate direction and the second minimum value along the second coordinate direction as coordinate values of the basis point.

8. The method as recited in claim 1, wherein the basis point in step (b) is an utmost basis point along the first coordinate direction or the second coordinate direction.

9. The method as recited in claim 1, further comprising a step of normalizing coordinate locations of the plurality of peak points.

10. The method as recited in claim 1, wherein the crystal array is a scintillation crystal array.

* * * * *